Figure 1:
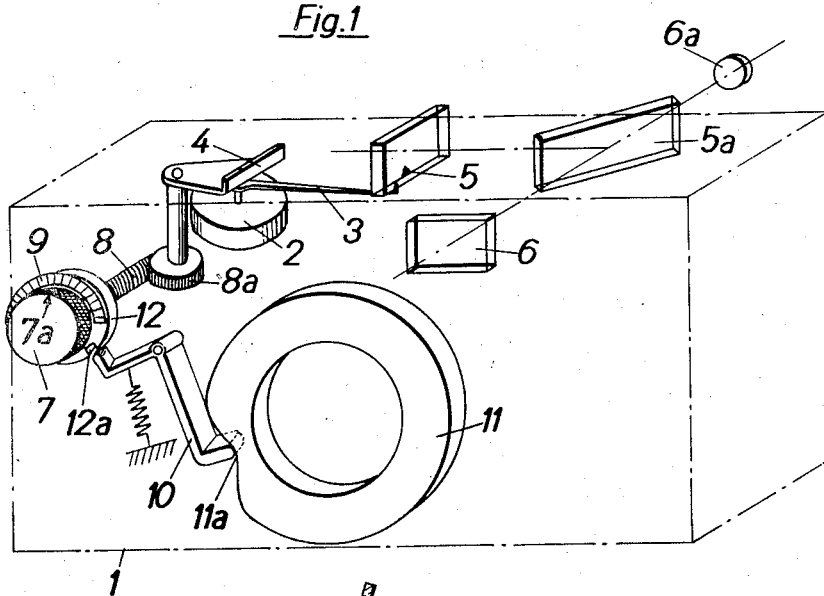

Nov. 25, 1958     A. WINKLER ET AL     2,861,505

PHOTOGRAPHIC EXPOSURE-TIME MEASURING DEVICE

Filed March 10, 1954     2 Sheets-Sheet 1

INVENTORS:
ALFRED WINKLER
WILLY KADEN
BY *Connolly and Hutz*
THEIR ATTORNEYS

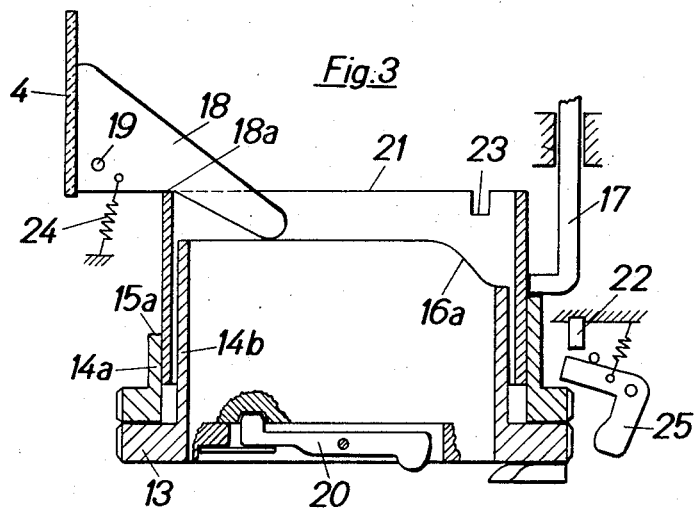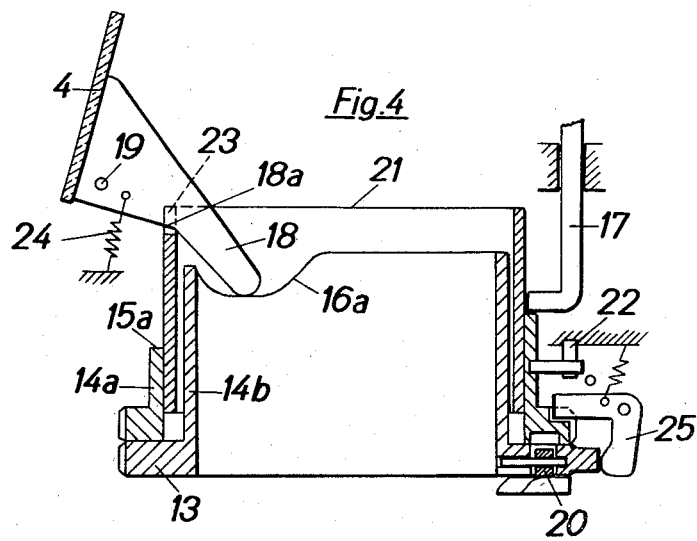

United States Patent Office 2,861,505
Patented Nov. 25, 1958

2,861,505

PHOTOGRAPHIC EXPOSURE-TIME MEASURING DEVICE

Alfred Winkler and Willy Kaden, Munich, Germany, assignors to AGFA Aktiengesellschaft Application March 10, 1954, Serial No. 415,341

Claims priority, application Germany March 30, 1953

10 Claims. (Cl. 95—10)

This invention relates to an exposure-time measuring device for photographic cameras having a built-in electrical exposure meter which is coupled with the shutter-adjusting means of the camera.

In the case of a relatively dark object to be photographed, or when it is necessary to stop down the diaphragm, long exposure times are necessary. The shutter is not able to be automatically released at such times and it is, therefore, necessary to release the shutter during "bulb" position of the exposure time adjusting ring and to personally count out the time of exposure.

In a case wherein the camera is equipped with an electrical exposure meter which is coupled with the adjusting means for the diaphragm and the exposure time for the purpose of regulating said adjusting means, the exposure meter is provided with an indicator which must be brought into coincidence with a fixed index mark in order to get a correct reading of the necessary adjustment. However, in the aforementioned case, it is not possible to bring the indicator to exact coincidence with the index mark; on the contrary, the indicator tends to remain somewhere between the zero point on the scale and the index mark. The difference between the position of the indicator, when the adjusting mechanism has been used to obtain the longest exposure possible, while still permitting the shutter to be automatically released (although this exposure time is still insufficient), and the index mark, can be used to establish the necessary exposure time.

It has been previously known in the art to measure this long exposure time with the above-described built-in exposure meter in such a manner that the galvanometer indicator in its final position between the zero point and the index mark is scanned by mechanical means, and the difference between the indicator and the index mark is evaluated to provide a measurement of the necessary exposure time. This process, and especially insofar as concerns the reproduction of the measured value, is complicated, since it involves the manipulation of complex mechanical means, and there is, therefore, required a large amount of skill on the part of the operator.

The essence of the present invention lies in the fact that the galvanometer indicator (which in the case of a dark object or when it is necessary to stop down the diaphragm) is brought into coinciding relationship with the index mark through a corresponding change of position of an optical means which serves to indicate the position of the indicator in the field of view of the finder. It is also part of the essence of this invention that the extent of the change of position of this optical means, which extent of change serves as a measurement for the necessary exposure time, is readable on a scale having graduations corresponding to time of exposure.

The aforementioned optical means for bringing the indicator into coinciding relationship with the fixed index mark may comprise either a revolving mirror, a pair of rotatable lenses or a rotary wedge. A feature of this invention is that the optical means for adjusting the indicator may be operated by a manual operating means such as a control button, a rotary knob or the like. This operating device cooperates with a scale for showing the "long" exposure times by means of an index mark thereon which is positioned upon the scale during actuation of the operating device. The operating device here shown as a rotatable knob, is adapted to be locked against movement relative to the exposure-setting ring during the greater part of the rotation of the ring, and the regular exposure-setting ring for the shutter is adapted to be locked against movement during the rotation of said knob. That knob is unlocked automatically, however, when the "bulb" position of the exposure-time setting ring is reached.

It is also within the scope of the invention to control the optical device without the use of control knobs or the like, but directly through the exposure-time setting ring of the camera. For this purpose two curved cams are superimposed on a tube connected to the exposure-time setting ring in such manner that the optical adjusting means for viewing the indicator is actuated only after the end of the "instantaneous" exposure times. In order to have a clear distinction between the "instantaneous" and "long" times, the "long" times might be marked in red or other distinctive color on the exposure-time setting ring.

Instead of providing two cam surfaces on one tube, two separate tubes can be used, one of such separate tubes being rigid with the exposure-time setting ring and movable therewith at all times while the other tube is locked to the ring during one rotational movement thereof and is thereafter automatically uncoupled therefrom during further rotation of the ring. During the initial rotational movement, when both tubes rotate with the ring, the releasable tube is the one which controls the exposure while the rigidly held tube is prevented from exerting any control over the exposure time by means of an appropriate locking device. When the releasable tube is automatically uncoupled during the second rotational movement, only the rigidly held tube is in a position to influence the exposure time. The tube which is releasably held by the ring is the one carrying the "instantaneous" time cam while the rigidly connected tube carries the "long" time cam. By adjusting the exposure time setting ring to "long" time, the shutter of the camera is automatically set to "bulb" through the "instantaneous" time control cam, therefore, in order to avoid faulty exposures while changing the exposure time setting from "instantaneous" to "long," a caution signal for the operator of the camera, for instance a red mark in the field of observation of the finder, can be released.

It is therefore an object of this invention to accurately determine long exposure periods and by means of an electrical time-exposure meter.

Another object of this invention is to provide relatively simple means for determining long exposure periods so that the mechanism may be operated by a relatively unskilled person.

Figure 2:
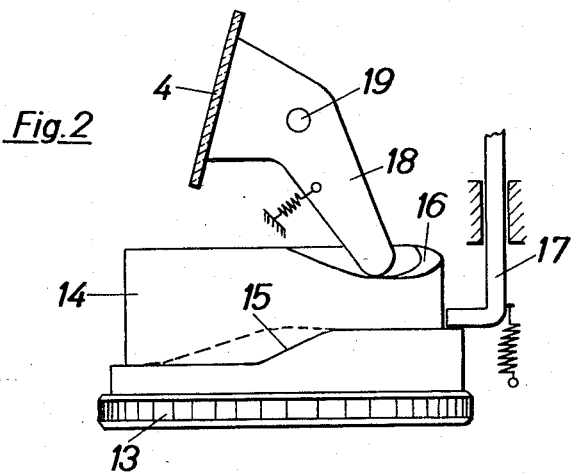

Other objects and many of the attendant advantages of this invention will be readily appreciated as the same becomes better understood by reference to the following detailed description when considered in connection with the accompanying drawings wherein:

Fig. 1 shows a device for adjusting the galvanometer indicator into coinciding relationship with a fixed index mark with the assistance of a special adjusting device, and illustrating the arrangement of the optical adjusting means, Fig. 2 shows a device for adjusting the galvanometer indicator by using the exposure time setting ring of the camera, Fig. 3 illustrates a device generally similar to that of Fig. 2 but showing a modified form thereof, and Fig. 4 shows the device of Fig. 3 but with the parts in unlocked position.

Referring now in greater detail to the drawings wherein similar reference characters refer to similar parts. Fig. 1 shows a camera casing generally designated 1. A galvanometer 2 is provided with an indicator arm 3.

A rotary mirror 4 produces an image of the point of said indicator arm 3, said image lying in the plane of mark 5. The image of said point of the indicator and the mark 5 are reflected into the line of vision between the lenses 6, 6a of the view finder of the camera via a transparent mirror 5a. While the camera shutter is being adjusted to the "bulb" release, the mirror 4 is rotatable for superposing said image of the point of the indicator 3 to mark 5 (an effect which could not be brought about even by a setting of the shutter to the longest "instantaneous" exposure period of the shutter scale when a relatively dark object is to be photographed).

As illustrated in Fig. 1 the rotational movement of the mirror 4 is effected by a control knob 7 specifically provided for this purpose. The control knob 7 is located at an accessible place on the camera casing and is connected to the rotary shaft of the mirror 4 by means of a gear and worm drive 8 and 8a. The extent of the rotational movement of the mirror 4 and, therefore, also of the control knob 7 necessary to effect the superposition of the image of the indicator 3 and the index mark 5 is measured. This extent of rotational movement is proportional to the necessary exposure time. The measurement of this extent of rotary movement is affected by an index mark 7a on the rotary knob 7 which cooperates with a scale 9. As will be hereafter fully brought out, the rotation of the mirror 4 by means of the knob 7 takes place only after the shutter-time setting means is the so called "bulb" set for exposure.

In order to prevent the rotary mirror 4 from being turned from its normal position duing the setting of the short or "instantaneous" exposure time by the time settting ring, a releasable locking means is provided between a tube 11 rigidly connected to the shutter-time setting ring and the control knob 7. The lock 10 is designed so that the control knob 7 and the disc 12, connected thereto, is prevented from rotating during the rotational movement of the shutter-time adjusting ring at all times except when the shutter-time setting ring is turned to the "bulb" position. At this position the tube 11 is provided with an indented cam face 11a which permits the lock 10 to be forced out of the slot 12a on the periphery of the disc 12 under spring tension. At this time the knob 7 is free to be manipulated for turning the mirror 4.

In Fig. 2 there is shown a modification of the invention whereby the shutter-time setting means on the camera can also be used to control the mirror 4, thereby obviating the necessity for control knobs and gear mechanisms such as shown in Fig. 1. In Fig. 2 the shutter-time setting ring 13 is shown rigidly connected to a tube 14 and being coaxial with the optical axis. A pair of control cams 15 and 16 are provided on the tube 14. A cam follower is provided on the end of lever 17. The lever 17 is adapted to control the shutter elements for the setting of "instantaneous" exposure times and is controlled by the cam 15. A second lever 18 pivotally mounted on a shaft 19 and spring tensioned toward a cam face 16 on the tube 14 is provided for the purpose of controlling the rotary mirror 4.

Each of the control cams 15 and 16 consist of a curved off-set section which releases the cam follower at that portion of its movement. Each of the cams also has a straight portion which does not change the position of its respective cam follower. The position of the curved off-set section of the cam 15 corresponds to the stright section of cam 16 and vice versa so that, during the rotation of the exposure-time setting ring, the control of the levers 17 and 18 and, thereby, the shutter elements and the rotary mirror 4, are timed to take place one after another. This cam arrangement, therefore, acts as a substitute for the disengagably locked mechanism between the exposure-time setting ring and the control knob 7, illustrated in Fig. 1. It is possible to adjust he shutter to the "bulb" position automatically by means of the cam 15 when the mirror 4 starts to turn out of its normal position.

The exposure-time scale on the adjusting ring 13 may be lengthened beyond the "instantaneous" exposure time values which normally are provided on this scale, the extra positions on the scale denoting the "long" times. These extra positions may be marked in red or any other distinctive color on the exposure time adjusting ring.

It should be noted that in the modification of Fig. 2 the cams 15 and 16 extend around the entire periphery of the tube 14. In the event a particularly accurate exposure-time adjustment is required, the cam surfaces on each of the cams 15 and 16 can extend the complete 360° around the respective cams. For this reason, in the third embodiment illustrated in Fig. 3, there are provided two coaxial tubes 14a and 14b adjacent the ring 13 and coaxial with the optical axis. The tube 14a is provided with a cam surface 15a for controlling the shutter elements through the lever 17 and the tube 14b is provided with the cam surface 16a for controlling the rotational movement of the mirror 4 through the lever 18. The tube 14b is integral with the ring 13 whereas the tube 14a is separable from the ring 13 but is adapted to be releasably connected thereto by a pivoted coupling device 20. During the time when the cam on tube 14a is operative to control the "instantaneous" shutter movement through lever 17, the control lever 18 is held in inoperative position by a pin guide 21 fixed on the tube 14a. However, during the change-over from the "instantaneous" shutter movement to the "long" shutter movement, the tube 14a abuts against a stop 22 while the lever 18 extends through a slot 23 on the tube 14a; at the same time the coupling member 20 is disengaged. During the further rotational movement of the adjusting ring 13 only the tube 14b turns, thereby controlling the rotary mirror 4 by means of the lever 18, which lever is held against the cam surface 16a by spring 24. The control cam 15a is designed in such a manner that the shutter is set to "bulb" when tube 14 abuts against the stop 22. A locking mechanism 25 is provided to engage the tube 14a in the area of the coupling engaging means.

In order to show the operator of the camera that the camera has been set to the "bulb" release at the time of the change-over from "instantaneous" to "long" and to thereby avoid a faulty exposure, a caution signal can be released at the time of such change in the form of a pivotal indicating device which is pivoted into the observation area at the time of the change.

Obviously many modifications and variations of the present invention are possible in the light of the above teachings. It is, therefore, to be understood that within the scope of the appended claims the invention may be practiced otherwise than as specifically described.

What is claimed in this invention is:

1. In a photographic camera, a shutter with a shutter-time setting means adapted to be set for "instantaneous" exposure and for "bulb" exposure, a means for indicating "bulb" exposure times comprising an exposure meter having a fixed index mark and a movable indicator, optical means for producing an image of said movable indicator, means operatively associated with said exposure meter for varying the position of said indicator in order to move said image of said indicator into a predetermined relationship to said fixed index mark when the exposure is to be made as an "instantaneous" exposure, movable means operatively associated with said optical means for moving at least a part of said optical means in order to move said image of said indicator into said predetermined relationship when the exposure is to be made as a "bulb" exposure, locking means operatively associated with said shutter-time setting means and adapted to allow movement of said movable means only when said shutter-time setting means is set for said "bulb" exposure, and means associated with said movable means for measuring the amount of movement of said movable means to move said image of said indicator into said predetermined relationship, said amount of movement of said movable means being a function of said "bulb" exposure time.

2. The device of claim 1, wherein said optical means comprises a rotary mirror.

3. The device of claim 1, wherein said movable means controlling said optical means cooperates with a scale proportional to those exposure times which exceed the instantaneous exposure times of said camera.

4. The device of claim 3, wherein said movable means is a rotary knob associated with said locking means, said locking means being a spring-pressed latch member controlled by an element of said shutter-time setting means.

5. The device of claim 1 wherein said shutter-time setting means and said movable means are actuated by a common control member.

6. The device of claim 1 wherein said shutter-time setting means is connected to a tube and said moving means comprise a cam surface on said tube, said cam surface controlling said optical means, said cam surface being so arranged that the actuation of said optical means is not effected until after a predetermined position of said shutter-time setting means is reached, said shutter-time setting means having a scale for measuring the "bulb" exposure times by the extent of movement of said shutter-time setting means after having passed said predetermined position.

7. The device of claim 6 wherein means are provided to keep the shutter in the "bulb" position after said shutter-time setting means has passed said predetermined position for controlling said optical means.

8. The device of claim 1 wherein said shutter-time setting means is connected to a first tube comprising a first cam surface for locking said optical means, said moving means comprising a second tube, and a second cam surface on said second tube for moving said optical means, said tubes being coaxially arranged and releasably coupled to one another, said first tube reaching a rest position after the completion of, in the highest case, one revolution of said two tubes while said second tube is adapted to continue its movement.

9. The device of claim 8 wherein the shutter-time setting means is set to the "bulb" position when said first tube reaches said rest position.

10. The device of claim 1 wherein a means is provided which releases a signal when said common control member passes the position corresponding to the change of the shutter control from "instantaneous" exposure times to "bulb" exposure times.

References Cited in the file of this patent
UNITED STATES PATENTS

| | | |
|---|---|---|
| 2,191,414 | Sauer | Feb. 20, 1940 |
| 2,358,083 | Mihalyi | Sept. 12, 1944 |
| 2,360,256 | Mihalyi | Oct. 10, 1944 |